(12) United States Patent
Goto et al.

(10) Patent No.: US 7,265,667 B2
(45) Date of Patent: Sep. 4, 2007

(54) COMMUNICATION SYSTEM, COMMUNICATION APPARATUS, IMAGE RECEPTION SYSTEM, AND COMMUNICATION METHOD

(75) Inventors: Koichi Goto, Kanagawa (JP); Tomokazu Okochi, Aichi (JP)

(73) Assignee: Sony Corporation (JP)

( * ) Notice: Subject to any disclaimer, the term of this patent is extended or adjusted under 35 U.S.C. 154(b) by 221 days.

(21) Appl. No.: 11/103,140

(22) Filed: Apr. 11, 2005

(65) Prior Publication Data
US 2005/0266807 A1    Dec. 1, 2005

(30) Foreign Application Priority Data
Apr. 12, 2004    (JP)    .............. 2004-117222

(51) Int. Cl.
*G08B 1/08*    (2006.01)
(52) U.S. Cl. .................. 340/539.15; 340/539.11; 340/568.1; 340/568.6; 340/573.1; 340/573.4; 340/693
(58) Field of Classification Search ........... 340/539.15, 340/539.11, 568.1, 568.6, 573.1, 573.4, 693
See application file for complete search history.

(56) References Cited
U.S. PATENT DOCUMENTS
5,640,262 A     6/1997  Hanai et al.
6,127,931 A *  10/2000  Mohr .................. 340/573.4

6,265,974 B1 *   7/2001  D'Angelo et al. ....... 340/568.1
6,593,851 B1 *   7/2003  Bornstein .............. 340/539.15
6,636,157 B1    10/2003  Sato
2002/0140963 A1 10/2002  Otsuka FOREIGN PATENT DOCUMENTS
JP      2001-203908 A      7/2001
WO      WO-03/098851 A1    11/2003

OTHER PUBLICATIONS

Chiasserini C F et al., "Combining Paging With Dynamic Power Management", Proceedings IEEE INFOCOM 2001, vol. 1 of 3, Conf. 20, Apr. 22, 2001, pp. 996-1004.

* cited by examiner

Primary Examiner—Tai Nguyen
(74) Attorney, Agent, or Firm—Lerner, David, Littenberg, Krumholz & Mentlik, LLP

(57) ABSTRACT

A communication system is capable of two-way wireless data communications between a parent unit and a child unit. The child unit includes a power switch for turning power to the child unit on/off; a power control signal issuing unit operable to issue a power control signal for turning power to the parent unit on/off in response to turning the power switch on/off; and a data communication unit operable to perform two-way wireless data communications with the parent unit. The parent unit includes a power control signal receiving unit operable to receive the power control signal from the issuing unit of the child unit; a power control unit operable to turn power to the parent unit on/off in response to reception of the power control signal from the receiving unit; and a data communication unit operable to perform two-way wireless data communications with the child unit.

6 Claims, 12 Drawing Sheets

COMMUNICATION SYSTEM, COMMUNICATION APPARATUS, IMAGE RECEPTION SYSTEM, AND COMMUNICATION METHOD

CROSS-REFERENCE TO RELATED APPLICATIONS

The present application claims priority from Japanese Application No. 2004-117222 filed on Apr. 12, 2004, the disclosure of which is incorporated herein by reference.

BACKGROUND OF THE INVENTION

The present invention relates to a communication system, a communication apparatus, an image reception system, and a communication method.

In a communication system where a parent unit and a child unit can carry out data communication with each other via a communication means, such as a wireless LAN (Local Area Network), both the parent unit and the child unit usually have a power switch. To carry out data communication in such a system, power must be turned on to both the parent unit and the child unit. Therefore, when starting the communication system, the power switch on both the parent unit and the child unit must be turned on first. This connects the parent unit and the child unit for establishing wireless LAN communication. In other words, the parent unit and the child unit recognize each other to establish wireless LAN communication. Once communication is established, the parent unit and the child unit can exchange data.

However, in a communication system where wireless communication is carried out between a parent unit and a child unit, the parent unit and the child unit are installed separately in many cases. A burdensome problem with such a system is that both the parent unit and the child unit must be turned on before starting data communication between them.

For example, in a communication system such as the one disclosed in Japanese Laid-Open Patent Application JP2001-203908, where video and audio wireless data communication is carried out between a television set (corresponding to a parent unit) having a large screen display and an auxiliary input/output unit (corresponding to a child unit) having a small-screen touch panel display, both the parent unit and the child unit, usually installed separately, must be turned on before starting wireless data communication. This may constitute a burdensome operation.

In particular, in such a communication system, the child unit receives a broadcast video, received by the tuner included in the parent unit, via wireless communication for displaying it on the display on the child unit side. Thus, even when the user wants to view the broadcast video only on the child unit side, there is a problem that, if the parent unit is not turned on, the user cannot watch the video on the child unit side.

A similar situation occurs when the user wants to view a video on the child unit side, for example, in a communication system where a video, received by a base station (corresponding to a parent unit) having a television tuner but not a display, is received by a display unit (corresponding to a child unit) via wireless two-way communication for displaying the video image thereon.

A problem similar to the one described above may occur in a communication system where wireless two-way communication is carried out between an "Airstation" (trademark of Buffalo Inc.) (corresponding to a parent unit) and a personal computer (corresponding to a child unit). If an "Airstation" device used as a parent unit does not consume considerable power, it may be kept on constantly. In such a case, simply turning on the power of the child unit may start the wireless communication. However, a parent unit such as a display unit on which the broadcast video described above is displayed consumes too much power to be on constantly. This means that it would be convenient for the parent unit to be automatically turned on when the child unit is turned on.

In view of the foregoing, there is a need for a communication system, a communication apparatus, an image reception system, and a communication method for automatically turning the power of a parent unit on by simply turning the power of a child unit on during wireless two-way communication in order to facilitate the operation of the wireless two-way communication

SUMMARY OF THE INVENTION

According to a preferred embodiment of the present invention, there is provided a communication system for performing two-way wireless data communications between devices. The communication system includes a child unit; and a parent unit operable to communicate with the child unit. The child unit includes a power switch for turning power to the child unit on/off; a signal generator operable to issue a power control signal for turning power to the parent unit on/off in response to turning the power switch on/off; and a first data communication unit operable to carry out two-way wireless data communications with the parent unit. The parent unit includes a receiving unit operable to receive the power control signal from the signal generator of the child unit; a power controller operable to turn power to the parent unit on/off in response to reception of the power control signal from the receiving unit; and a second data communication unit operable to carry out two-way wireless data communications with the child unit.

In accordance with a preferred embodiment of the present invention, the communication system may allow the user to turn on the power to the parent unit by simply turning on the power switch of the child unit and to turn off the power to the parent unit by simply turning off the power switch of the child unit, thus eliminating the need for the user to go to the parent unit to turn on its power switch. This allows the user to carry out wireless, two-way communications with the parent unit simply by turning on the power to the child unit, increasing the ease of use. In particular, because the child unit and the parent unit are installed separately and the child unit is in many cases readily available at hand, the ability to start wireless communications with the parent unit simply by turning on the power switch of the child unit improves convenience.

The signal generator of the child unit in the communication system described above preferably includes an interlock switch that is actuated in response to operation of the power switch, and a light emitting unit operable to emit the power control signal as infrared light in response to actuation of the interlock switch; and the receiving unit of the parent unit preferably includes a light receiving unit operable to receive the power control signal as infrared light from the child unit. Thus, when the power switch of the child unit is turned on, the power control signal which may be an infrared signal may be issued immediately by the interlock switch to turn on the power to the parent unit.

Preferably, the signal generator of the child unit includes a determination unit operable to determine whether the power switch of the child unit is turned on or off, and a light emitting unit operable to issue the power control signal as infrared light based on a result of the determination by the determination unit; and the receiving unit of the parent unit includes a light receiving unit operable to receive the power control signal as infrared light from the child unit.

Preferably, the signal generator of the child unit includes a transmitter operable to transmit the power control signal as an electric wave in response to the operation of the power switch; and the receiving unit of the parent unit includes a receiver operable to receive the power control signal as an electric wave from the transmitter of the child unit. Using an infrared optical signal, such as that used for a remote control and so on, or an electric wave, such as that used for a keyless entry system, the power to the parent unit can be turned on even when the power is not turned on at the parent unit.

According to another preferred embodiment of the present invention, there is provided a communication apparatus capable of two-way wireless data communications with a parent unit. The communication apparatus includes a power switch for turning power to the communication apparatus on/off; a signal generator operable to issue a power control signal for turning power to the parent unit on/of in response to turning the power switch on/off; and a data communication unit operable to carry out two-way wireless data communications with the parent unit.

According to another preferred embodiment of the present invention, there is provided a communication apparatus capable of two-way wireless data communications with a child unit, the communication apparatus including a receiving unit operable to receive a power control signal from the child unit; a power controller operable to turn power to the communication apparatus on/off in response to reception of the power control signal from the receiving unit; and a data communication unit operable to carry out two-way wireless data communications with the child unit.

The child unit and the parent unit having configurations as described above may allow the user to turn on the power to the parent unit simply by turning on the power switch of the child unit, thus eliminating the need to go to the parent unit to turn on the power switch and thereby increasing the ease of use.

According to another preferred embodiment of the present invention, an improved image reception system is provided to solve the above problems. The image reception system carries out two-way wireless data communications of a multimedia content between devices and includes a child unit; and a parent unit operable to communicate with the child unit. The child unit includes a power switch for turning power to the child unit on/off; a signal generator operable to issue a power control signal for turning power to the parent unit on/off in response to turning the power switch on/off; a first data communication unit operable to carry out two-way wireless data communications with the parent unit; and a secondary display for playing back the multimedia content. The parent unit includes a receiving unit operable to receive the power control signal from the signal generator of the child unit; a power controller operable to turn power to the parent unit on/off in response to reception of the power control signal from the receiving unit; a second data communication unit operable to carry out two-way wireless data communications with the child unit; and a primary display for playing back the multimedia content.

The image reception system according to a preferred embodiment of the present invention eliminates the need to go to the parent unit to turn on the power switch because the power to the parent unit can be turned on simply by turning on the power switch of the child unit. This enables two-way wireless data communications with the parent unit simply by turning on the power to the child unit, thus increasing the ease of use. In particular, the child unit of this image reception system can wirelessly receive a broadcast video from the tuner included in the parent unit, and can display the broadcast content on the secondary display on the child unit side. Therefore, when the user wants to view the broadcast video only on the secondary display on the child unit side, the user need only turn on the power switch of the child unit. Then, the power supply of the parent unit is automatically turned on, and wireless communication between the child unit and the parent unit becomes possible. As described above, simply turning on the power switch of the child unit may allow the user to view a video on the child unit and therefore, as compared with the conventional system in which the power switch of the parent unit must also be turned on, this system ensures increased ease of use.

Preferably, the signal generator of the child unit of the image reception system described above includes an interlock switch that is actuated in response to operation of the power switch of the child unit, and a light emitting unit operable to emit the power control signal as infrared light in response to actuation of the interlock switch; and the receiving unit of the parent unit includes a light receiving unit operable to receive the power control signal as infrared light from the child unit. In this configuration, when the power switch of the child unit is turned on, the power control signal, which may be an infrared light, is immediately issued via the interlock switch and the power to the parent unit is turned on.

Preferably, the signal generator of the child unit includes a determination unit operable to determine whether the power switch of the child unit is turned on or off, and a light emitting unit operable to issue the power control signal as infrared light based on a result of the determination by the determination unit; and the receiving unit of the parent unit includes a light receiving unit operable to receive the power control signal as infrared light from the child unit.

Preferably, the signal generator of the child unit includes a transmitter operable to transmit the power control signal as an electric wave in response to operation of the power switch of the child unit; and the receiving unit of the parent unit includes a receiver operable to receive the power control signal as an electric wave from the transmitter of the child unit.

The parent unit of the image reception system described above may further include a content reception unit operable to receive the multimedia content; and the power controller of the parent unit may be further operable to supply or interrupt a driving voltage to at least the second data communication unit and the content reception unit when the receiving unit receives the power control signal from the child. By supplying the driving voltage to a portion of the circuits of the parent unit in this way, only the required and sufficient portions of the parent unit can be driven for viewing at the child unit side. Because the primary display having a power consuming, large screen is off in this case, the power consumption can be reduced.

Preferably, the child unit of the image reception system described above includes a primary display switch for turning power to the primary display of the parent unit on/off; the signal generator of the child unit issues a primary display power control signal when the primary display switch is turned on/off; and when the receiving unit of the parent unit receives the primary display power control signal from the signal generator of the child unit, the power controller supplies or interrupts a driving voltage to the primary display and to a section that performs processing for the primary display based on the primary display power control signal. This allows the user, if he/she also wants to view a video on the primary display, to turn on the power to the primary display and watch the video thereon simply by turning on the primary display switch on the child unit, thus increasing the ease of use.

According to another preferred embodiment of the present invention, there is provided a communication apparatus capable of two-way wireless data communications of a multimedia content with a parent unit having a primary display for playing back the multimedia content. The communication apparatus includes a power switch for turning power to the communication apparatus on/off; a signal generator operable to issue a power control signal for turning power to the parent unit on/off in response to turning the power switch on/off; a data communication unit operable to carry out two-way wireless data communications with the parent unit; and a secondary display for playing back the multimedia content.

According to another preferred embodiment of the present invention, there is provided a communication apparatus capable of two-way wireless data communications of a multimedia content with a child unit having a secondary display for playing back the multimedia content. The communication apparatus includes a receiving unit operable to receive a power control signal from the child unit; a power controller operable to turn power to the communication apparatus on/off in response to reception of the power control signal from the receiving unit; a data communication unit operable to carry out two-way wireless data communications with the child unit; and a primary display for playing back the multimedia content.

The child unit and the parent unit having such configurations may allow the user to turn on the power to the parent unit simply by turning on the power switch of the child unit of the image reception system, thus eliminating the need to go to the parent unit to turn on the power switch and thereby increasing the ease of use.

According to still another preferred embodiment of the present invention, an improved method is provided for carrying out two-way wireless data communications between a parent unit and a child unit, the method including issuing a power control signal for turning power to the parent unit on/off in response to turning power to the child unit on/off; receiving the power control signal at the parent unit; turning the power to the parent unit on/off in response to reception of the power control signal; and carrying out two-way wireless data communications between the parent unit and the child unit when the power to the child unit is turned on.

Preferably, in the issuing step of the method described above, the power control signal is issued as infrared light from the child unit; and in the receiving step, the power control signal is received as infrared light at the parent unit.

Preferably, in the issuing step of the method described above, it is determined whether the power to the child unit is turned on or off, and the power control signal is issued as infrared light from the child unit based on a result of the determination; and in the receiving step, the power control signal is received as infrared light at the parent unit.

Preferably, in the issuing step of the method described above, the power control signal is transmitted as an electric wave from the child unit; and in the receiving step, the power control signal is received as an electric wave at the parent unit.

As described above, the communication system, the communication apparatus, the image reception system, and the communication method in accordance with the preferred embodiments of the present invention may allow the user to automatically turn on the power to a parent unit simply by turning on the power to a child unit, thereby making the wireless two-way communication operation straightforward and improving the ease of use.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION

Figure 1:
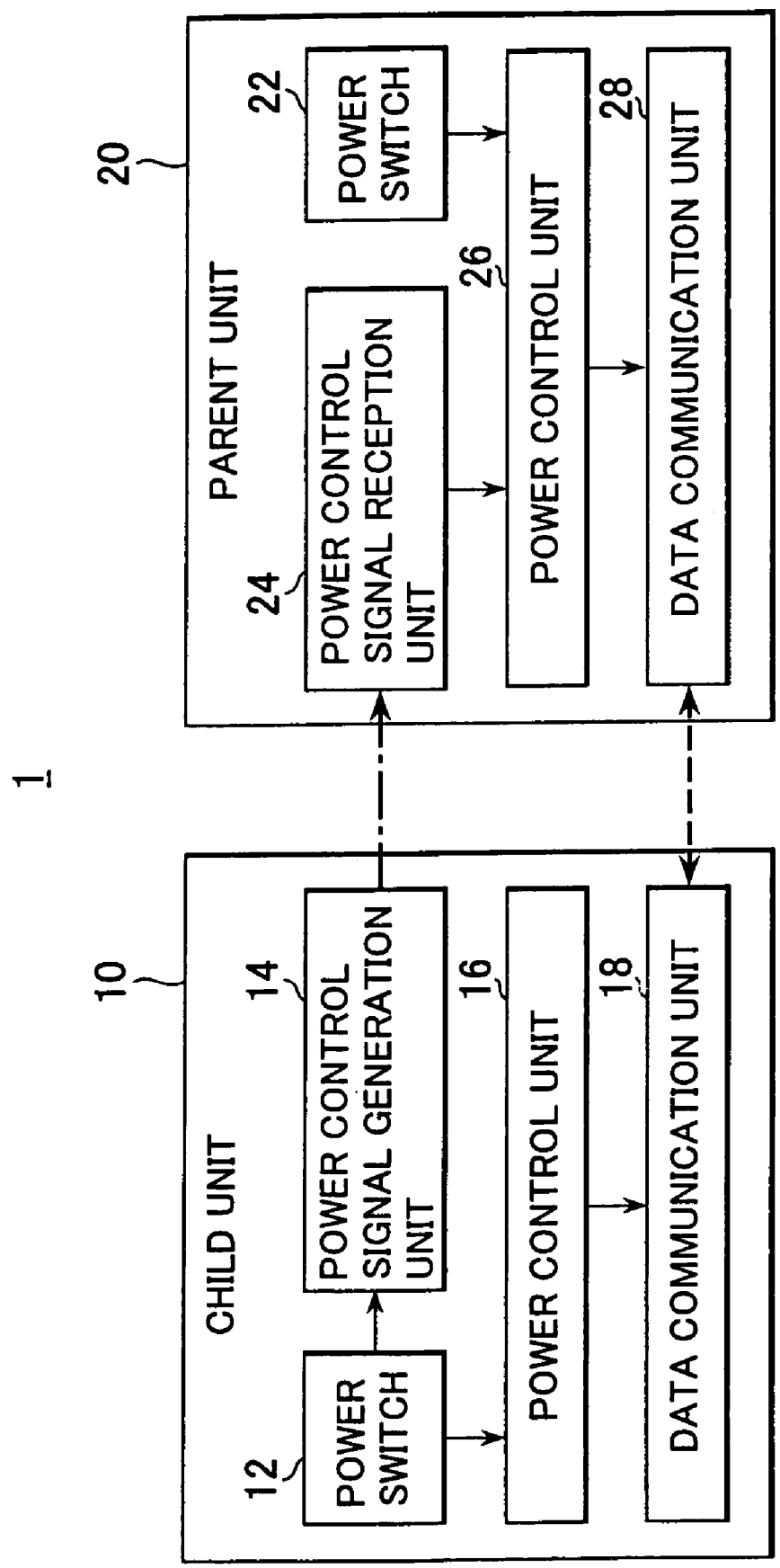
FIG. 1 is a block diagram showing an example of the configuration of a communication system according to a preferred embodiment of the present invention.

Preferred embodiments of the present invention will be described in detail with reference to the attached drawings. In the specification and the drawings, the same reference numeral is assigned to the substantially same component to avoid redundancy in the description.

First, with reference to the drawings, a first preferred embodiment of the present invention will be described in connection with a communication system in which a parent unit and a child unit may be used to carry out two-way wireless data communications. FIG. 1 is a block diagram showing the general configuration of a communication system 1 according to this embodiment. The communication system 1 according to this embodiment includes a child unit 10 and a parent unit 20. The child unit 10 may include a power switch 12 for turning on/off the power of the child unit 10; a power control signal generation unit 14 that is an example of issuing means that interlocks with the power switch 12 for issuing the power control signal for turning on/off the power of the parent unit 20; and a power control unit 16 that is an example of power control means that, as the power switch 12 is turned on/off, supplies or interrupts a driving voltage from the power supply to or from the components including a data communication unit 18. The data communication unit 18 carries out two-way wireless data communications with the parent unit 20 that will be described later.

The parent unit 20 may include a power switch 22 for turning on/off the power of the parent unit 20; a power control signal reception unit 24 that is an example of reception means for receiving a power control signal from the power control signal generation unit 14 of the child unit 10; and a power control unit 26 that supplies or interrupts a power supply voltage from the power supply to or from the components including a data communication unit 28 of the parent unit 20. The power control unit 26 supplies the power supply voltage to the components of the parent unit 20 as the power switch 22 is turned on. In addition, even when the power switch 22 is not turned on, the power control unit 26 supplies the driving voltage to the components of the parent unit 20 in response to a power control signal that the power control signal reception unit 24 receives from the child unit 10. The data communication unit 28 carries out two-way wireless data communications with the data communication unit 18 of the child unit 10.

Figure 2A:
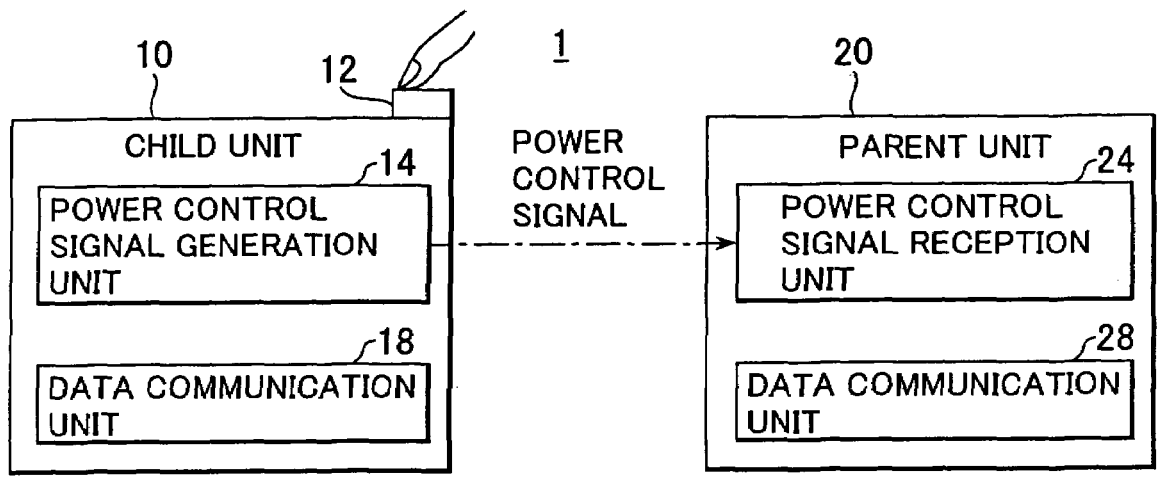
FIGS. 2A, 2B, and 2C are diagrams showing the power-on operation of the communication system according to a preferred embodiment of the present invention.

When the power switch 12 of the child unit 10 is turned on in the communication system 1 having the configuration as shown in FIG. 2A, the necessary driving voltage is supplied to the components of the child unit 10 and, in conjunction with the event of the power switch 12 being turned on, a power control signal is issued from the power control signal generation unit 14. When the power control signal reception unit 24 of the parent unit 20 receives the power control signal from the power control signal generation unit 14 of the child unit 10, the necessary driving voltage is supplied from the power supply to the components of the parent unit 20 even when the power switch 22 of the parent unit 20 is not turned on. At this event, because the driving voltage is also supplied to the data communication unit 28 of the parent unit 20, mutual communications can be carried out between the data communication unit 18 of the child unit 10 and the data communication unit 28 of the parent unit 20.

Figure 2B:
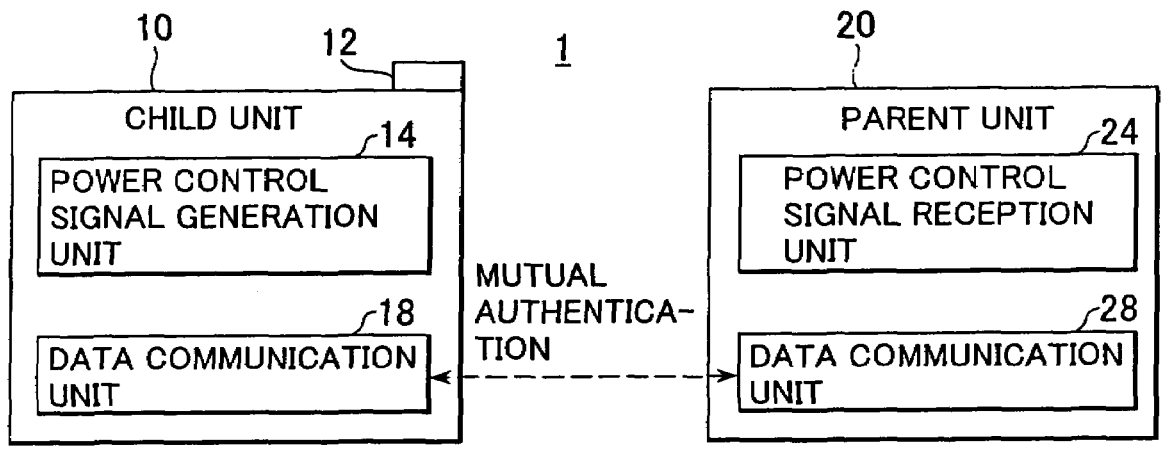
Figure 2C:
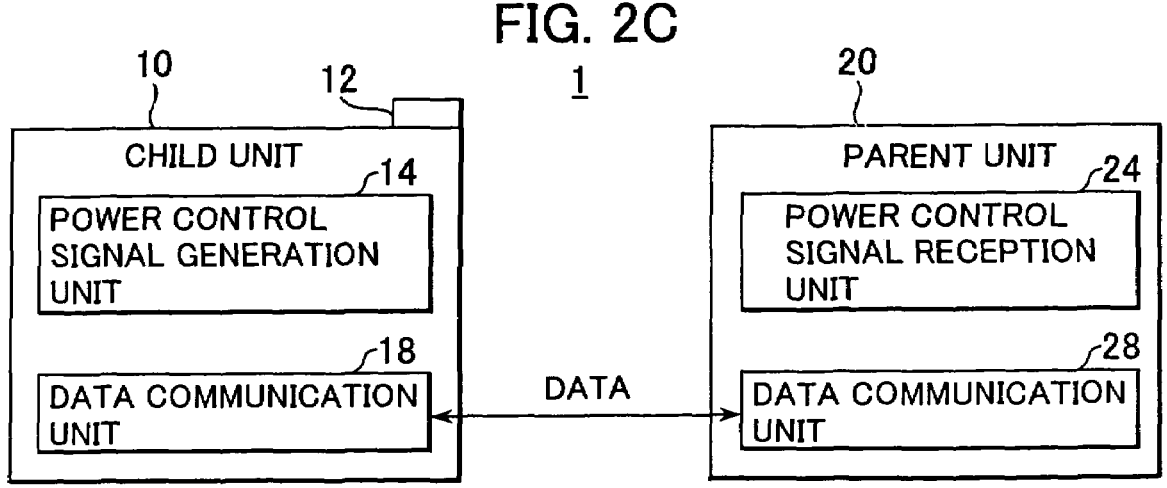

As described above, when the power switch 12 of the child unit 10 is turned on, the power of the parent unit 20 is turned on to allow the child unit 10 and the parent unit 20 to carry out mutual communication. Thus, as shown in FIG. 2B, the data communication unit 18 of the child unit 10 performs wireless communication authentication (mutual authentication) with the data communication unit 28 of the parent unit 20. Once the wireless communication is established, data is transmitted or received wirelessly as shown in FIG. 2C in response to a request entered via a user operation executed on the child unit 10 or the parent unit 20.

The communication system 1 like this may allow the user to turn on the power of the parent unit 20 by simply turning on the power switch 12 of the child unit 10 and to turn off the power of the parent unit 20 by simply turning off the power switch of the child unit 10, thus eliminating the need for the user to go to the parent unit 20 to turn on the power switch. This allows the user to carry out wireless, two-way communication with the parent unit 20 by simply turning on the power of the child unit 10, increasing the ease of use. Because the child unit 10 and the parent unit 20 are installed separately and the child unit 10 is near at hand in many cases, the ability to start wireless communication with the parent unit 20 by simply turning on the power switch of the child unit 10 improves convenience.

The power control signal issued by the power control signal generation unit 14 of the child unit 10 may be, for example, an optical signal such as an infrared light used for a remote control or a radio signal used for a keyless entry system such as the one used for a car. However, the power control signal is not limited to those kinds of signals. In other words, any communication means can be used that can turn on the power of the parent unit 20 when the power is not turned on. Communication means not requiring mutual authentication between the child unit 10 and the parent unit 20 may also be used.

Figure 3:
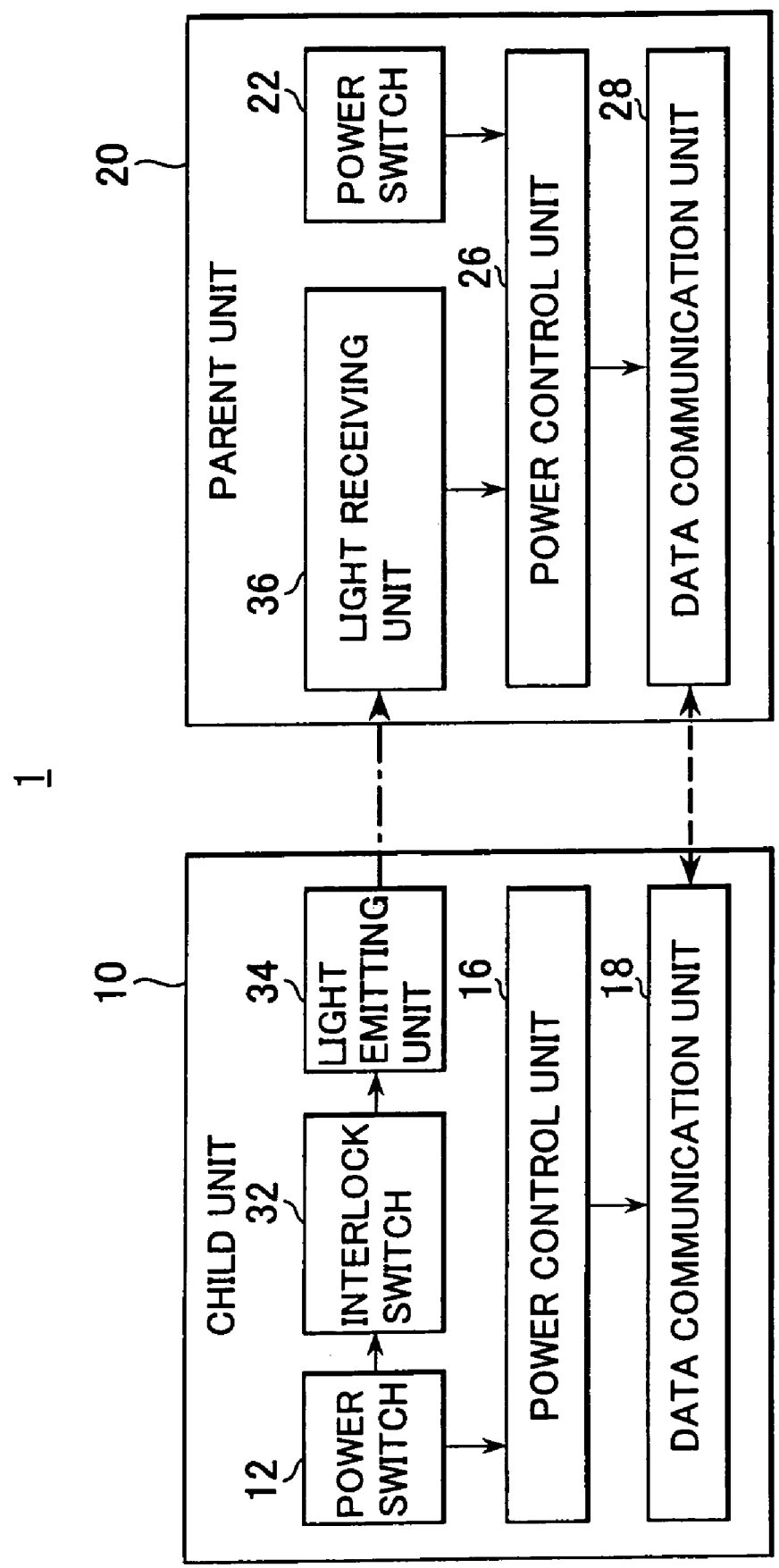
FIG. 3 is a block diagram showing another example of the configuration of the communication system according to a preferred embodiment of the present invention.

For example, as shown in FIG. 3, the power control signal generation unit 14 of the child unit 10 may include an interlock switch 32 that interlocks with the power switch 12 and a light emitting unit 34 that emits an optical signal which may be an infrared light generated when the interlock switch 32 is turned on. In this case, the power control signal reception unit 24 of the parent unit 20 may include a light receiving unit 36 that receives the optical signal from the child unit 10. The power control signal used in this case may be a signal such as the one generated by converting data of a predetermined command to an optical signal, for example.

Figure 4:
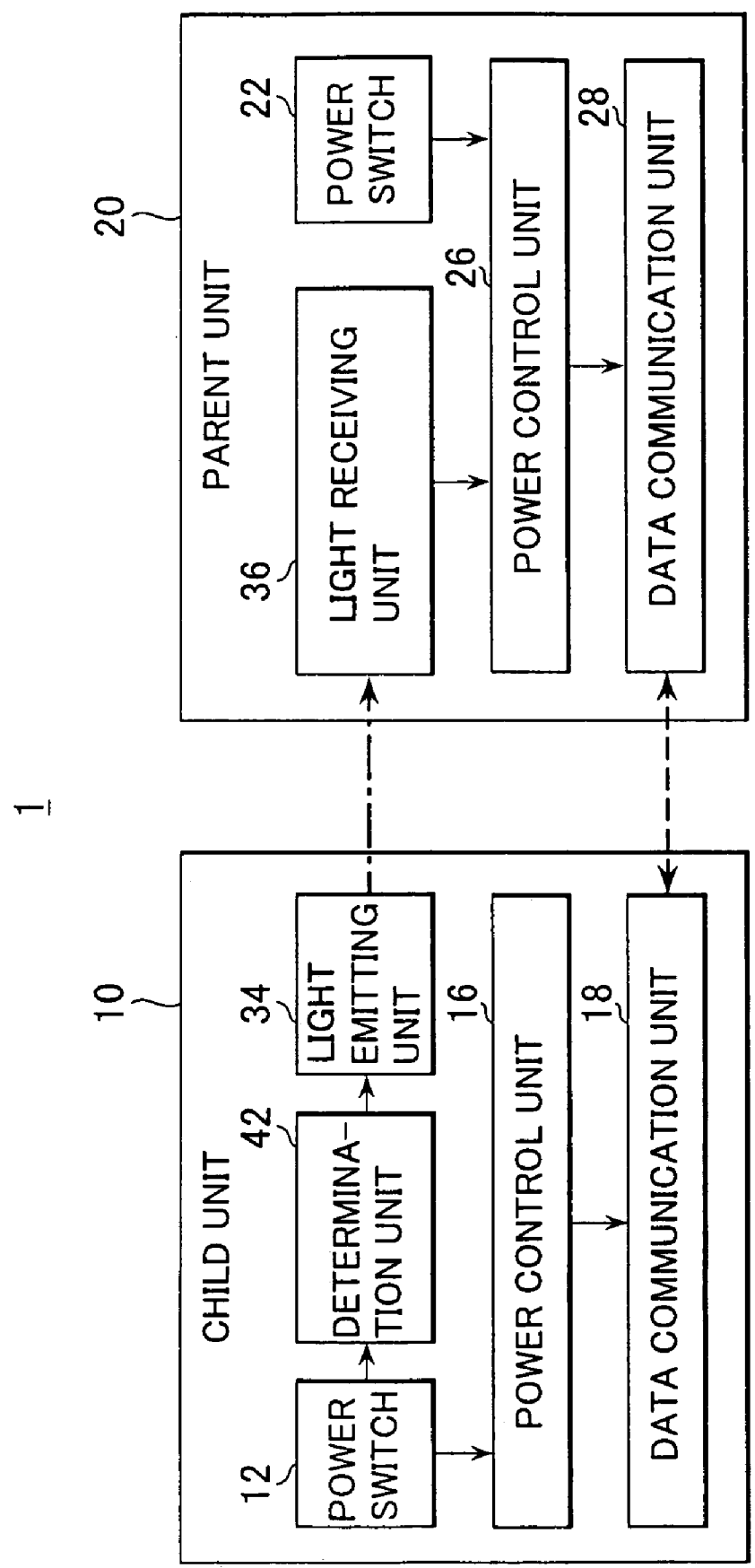
FIG. 4 is a block diagram showing still another example of the configuration of the communication system according to a preferred embodiment of the present invention.

The power control signal generation unit 14 of the child unit 10 is not always required to have the interlock switch 32, such as the one shown in FIG. 3, which interlocks with the power switch 12. For example, it is also possible to provide a determination unit 42, which determines if the power switch 12 is on/off, as shown in FIG. 4, instead of providing the interlock switch to allow the light emitting unit 34 to issue the power control signal based on the determination result of the determination unit 2.

Figure 5:
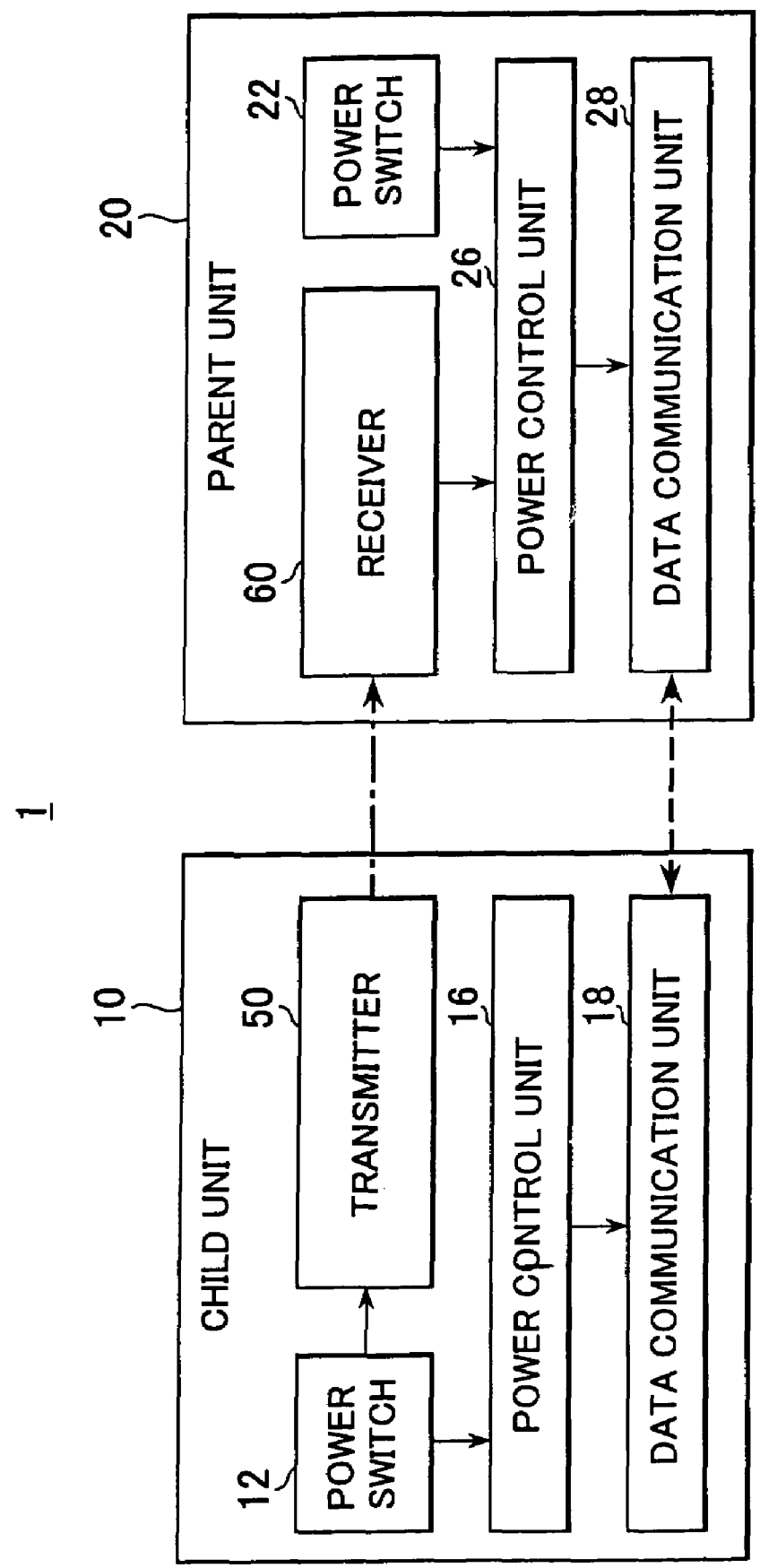
FIG. 5 is a block diagram showing still another example of the configuration of the communication system according to a preferred embodiment of the present invention.

As shown in FIG. 5, it is also possible for the power control signal generation unit 14 of the child unit 10 to include a transmitter 50 that issues a predetermined electric wave signal such as the one used, for example, for the keyless entry system of a car, and for the power control signal reception unit 24 of the parent unit 20 to include a receiver 60 that receives the electric wave signal from the transmitter 50.

Figure 6:
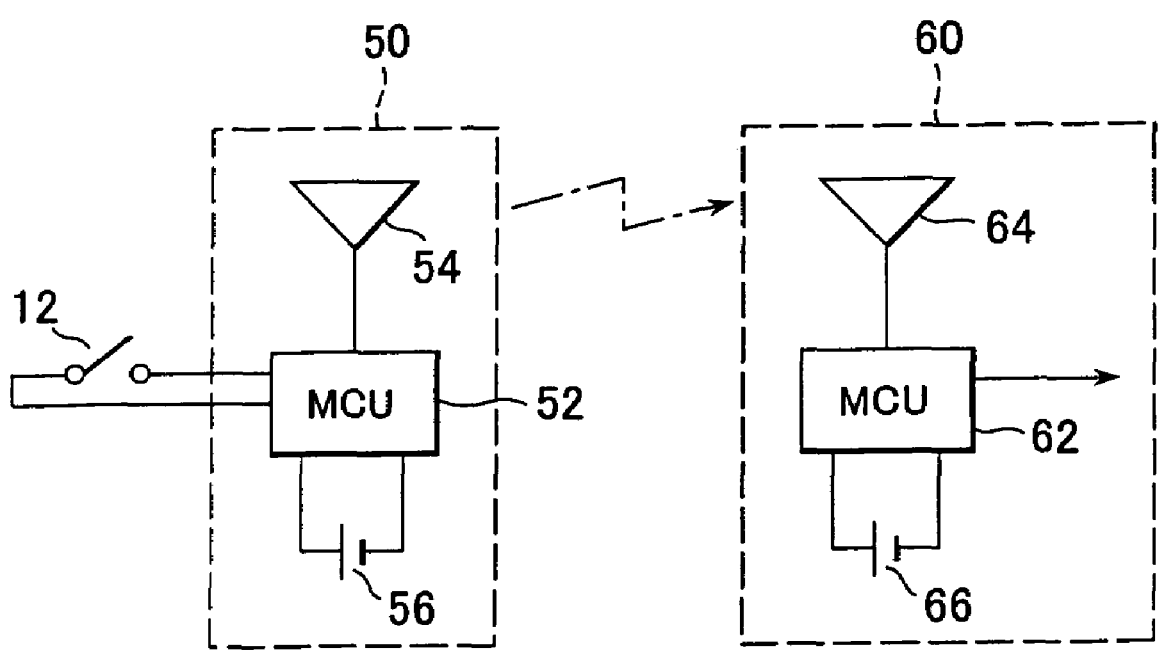
FIG. 6 is a diagram showing an example of the actual configuration of a transmitter and a receiver in the communication system shown in FIG. 5.

FIG. 6 shows an example of an actual configuration of the transmitter 50 and the receiver 60. The transmitter 50 of the child unit 10 may include an MCU (Micro Controller Unit) 52, an antenna 54 connected to the MCU 52, and a battery 56. The MCU 52 of the transmitter 50 is connected to the power switch 12 of the child unit 10. The receiver 60 of the parent unit 20 may include an MCU 62, an antenna 64 connected to the MCU 62, and a battery 66. The output signal from the receiver 60 is supplied to the power control unit 26. The power consumption of the batteries 56 and 66 is considerably low because they are required only to drive the MCUs.

When the power switch 12 of the child unit 10 is turned on in this configuration, the transmitter 50 issues an electric wave, which may be modulated by the MCU 52 by modulating a preset ID (corresponding to the power control signal described above), from the antenna 54. The receiver of the parent unit 20 receives the electric wave from the transmitter 50 via the antenna 64, demodulates the electric wave to obtain the ID and, if the ID matches the pre-set ID, outputs an output signal. Therefore, if this output signal is set to a predetermined command for turning on the power of the parent unit 20, in other words, the same code corresponding to the optical signal such as the infrared light received by the light receiving unit 36, the output signal can be used in place of the output from the light receiving unit 36 to the power control unit 26. In this way, in a configuration in which the parent unit 20 includes both the receiver 60 and the light receiving unit 36, the logical addition (OR) of the output from the light receiving unit 36 and the output from the receiver 60 can be entered into the power control unit 26 to turn on the power of the parent unit 20 when the output is received either from the light receiving unit 36 or the receiver 60.

One example of a communication system 1 having the child unit 10 and the parent unit 20 such as those described above is an image reception system in which the wireless data communication of video and audio data is carried out between a television set (corresponding to a parent unit) having a large screen display and an auxiliary input/output unit (corresponding to a child unit) having a small-screen touch panel. An image reception system like this to which the present invention is applied will be described later in detail.

The communication system 1 according to another preferred embodiment of the present invention is applicable to an image reception system in which a video, received by a base station (corresponding to a parent unit) having a TV tuner but not a display, is sent to a display unit (corresponding to a child unit) via wireless two-way communication for displaying it thereon. In addition, the communication system 1 is applicable to a communication system in which wireless two-way communication is carried out between an "Airstation" (a trademark of Buffalo, Inc.)(corresponding to a parent unit) and a personal computer (corresponding to a child unit).

Figure 7:
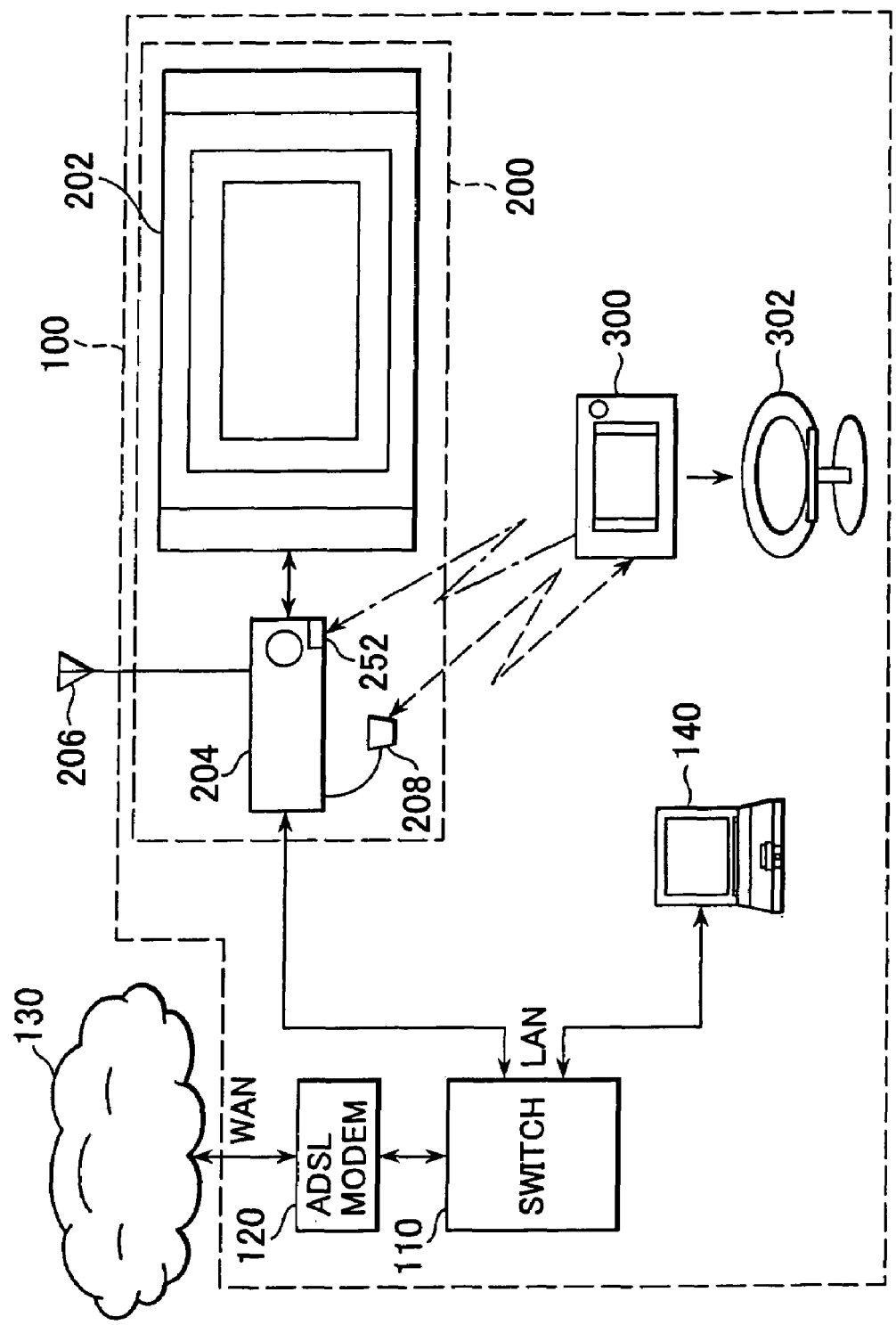
FIG. 7 is a diagram showing an example of the general configuration of an image reception system according to another preferred embodiment of the present invention.

Next, with reference to the drawings, a second preferred embodiment of the present invention will be described in which an image reception system is provided permitting reception and watching of a broadcast program and the like or content from the Internet via two display units including one large display unit and one small display unit. FIG. 7 is a diagram showing the general configuration of image reception system 100. The image reception system 100 may include a first display unit, for example, a primary display unit 202, that has a large display panel such as a PDP (Plasma Display Panel) or an LCD (Liquid Crystal Display); a media receiver 204 connected to the primary display unit 202; and a second display unit, for example, a secondary display unit 300, that has a small display panel. The media receiver 204 receives video and music data, which will be displayed on the display units 202 and 300, via a broadcast or the Internet. The primary display unit 202 and the media receiver 204 described above constitute a parent unit 200 according to the preferred embodiment of the present invention, and the secondary display unit 300 constitutes a child unit according to the preferred embodiment.

The secondary display unit 300 may be composed of a small LCD, such as a 7-inch LCD, and a touch panel. The secondary display unit 300 includes circuits for communication with the primary display unit 202, compression/decompression processing, and system control. The secondary display unit 300, placed on a table 302, is configured so that the user can carry it as necessary.

The video signal of a video to be displayed on the screen is supplied to the primary display unit 202 via the media receiver 204. The video signal may be, for example, a broadcast signal or streaming data delivered via the Internet. The broadcast signal, one of the video signals, is received from an antenna 206. The streaming data is supplied from a line network, such as the Internet 130, to the media receiver 204 via a modem 120 that is LAN (Local Area Network) connected to a switch 110. The switch 110 can be a multiple-terminal switch where the media receiver 204 is connected to one branch terminal and the personal computer 104 is connected to the other branch terminal.

The modem 120 may be, for example, an ADSL (Asymmetric Digital Subscriber Line) modem (modulator-demodulator). The Internet 130 is connected to the WAN (Wide Area Network) side of the ADSL, and the switch 110 is connected to the LAN side of the ADSL. An ADSL is an example of a broadband connection. Instead of the ADSL, a broadband connected via CATV or FTTH (Fiber To The Home) can also be used to receive video content. In addition, streaming data can be obtained using an IP (Internet Protocol) streaming broadcast. Not only video data but also audio data, such as voice data and music data, is usually attached to data such as video content.

The media receiver 204 may have two tuners to allow separate television broadcast programs to be supplied to the primary display unit 202 and the secondary display unit 300, one for each. The media receiver 204 sends a video signal to the secondary display unit 300 via an access point 208 of the wireless LAN. On the other hand, control data such as a remote control signal can be sent from the secondary display unit 300 to the access point 208 for use in two-way communication. For example, the wireless method conforming to the IEEE (Institute of Electrical and Electronics Engineers) 802.11 specifications can be used, and 802.11a, a standard defined for that method, can be used. The IEEE 802.11a standard has a maximum transmission rate of 54 Mbps and uses frequencies in the 5.2 GHz range.

Figure 8:
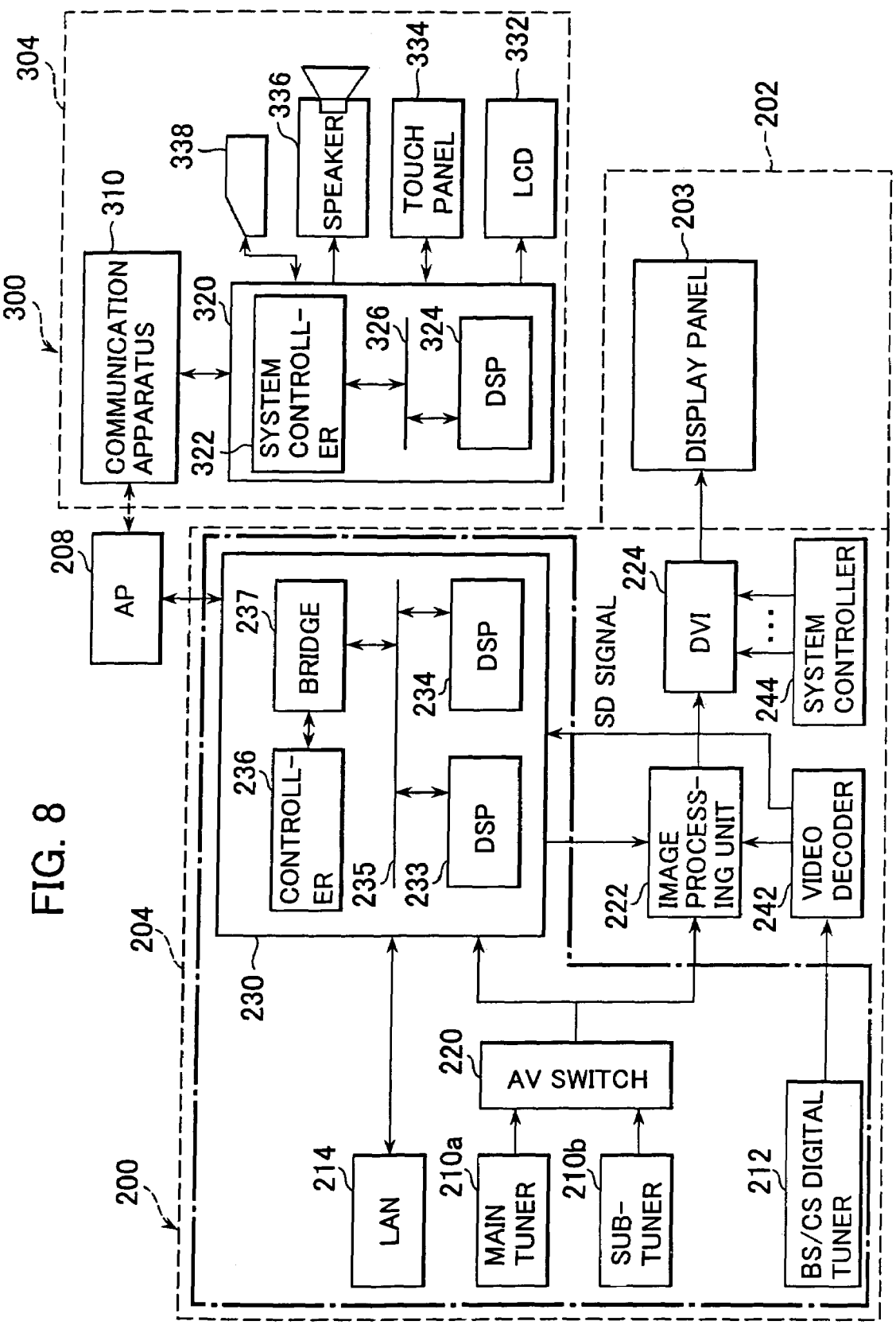
FIG. 8 is a block diagram showing an example of the actual configuration of the image reception system according to a preferred embodiment of the present invention.

Next, an example of an actual configuration of the media receiver 204 and the secondary display unit 300 will be described. FIG. 8 is a block diagram showing the general configuration of the media receiver and the secondary display unit. FIG. 8 is a block diagram of the circuits for executing data processing including data image processing and communication processing for data such as received video content. The primary display unit 202 includes a relatively large display panel 203, such as a 30-inch or larger panel, and its driving unit (not shown).

The media receiver 204 includes data receiving units. For example, the data receiving units include a main tuner 210a and a sub-tuner 210b for receiving land broadcasts. The two tuners, if provided as described above, could supply separate television broadcast programs to each of the primary display unit 202 and the secondary display unit 300, one for each. According to this embodiment, the main tuner 210a is used for the primary display unit 202, and the sub-tuner 210b for the secondary display unit 300 (child unit). Although not shown, the output of a UHF/VHF antenna is supplied to the main tuner 210a and the sub-tuner 210b.

In addition to those data receiving units described above, the media receiver 204 includes a BS/CS digital tuner 212 for receiving BS (Broadcasting Satellite) digital and 110° CS (Communication Satellite) digital broadcasts. Although not shown, the output of a parabolic antenna for receiving BS/110° CS digital broadcasts is supplied to the BS/CS digital tuner 212. A LAN 214, which receives streaming data from the Internet, is also a data receiving unit.

The video signals from the main tuner 210a and the sub-tuner 210b described above are supplied to an AV switch

220. The output video signal from the AV switch 220 is input to an image processing unit 222 and a signal processing unit 230. The image processing unit 222 performs image processing to improve the image quality, for example, to increase the resolution.

The output signal from the image processing unit 222 is input to the display panel 203 of the primary display unit 202 via the display interface, such as a DVI (Digital Visual Interface) 224. Although not shown, an image adjustment circuit of the display panel 203 is provided in the stage preceding the DVI 224. When the digital video signal is supplied to the display panel 203, a copy prevention signal for preventing an unauthorized copy of the broadcast content is also output. For example, HDCP (High bandwidth Digital Content Protection) can be used for copy prevention.

The output signal of the BS/CS digital tuner 212 is input to a video decoder 242. For example, the video decoder 242 may decompress an MPEG2 (Moving Picture Experts Group Phase 2) coded signal. The HD (High Definition) video signal is supplied from the video decoder 242 to the image processing unit 222 for input to the display panel 203 via the DVI 224.

The video decoder 242 has a function to output an SD (Standard Definition) video signal (for example, an interlace signal with 480 effective lines) to the signal processing unit 230. The media receiver 204 may include a system controller 244 that controls the operation of the primary display unit 202 and the media receiver 204. The system controller 244 may include a CPU (Central Processing Unit) and other components. For example, the system controller 244, which controls the channel selection status of both the main tuner 210a and the sub-tuner 210b, maintains the current channel selection status information on the tuners 210 for controlling the channel selection.

The signal processing unit 230 receives not only the signal from the AV switch 220 but also streaming data and HTML (Hypertext Markup Language) content data such as web pages via the LAN 214. The signal processing unit 230 includes two DSPs (Digital Signal Processors) 233 and 234, a controller 236 composed of a CPU, and a bridge 237. The DSPs 233 and 234 described above are connected to a bus such as a PCI (Peripheral Component Interconnect) 235, and the controller 236 is connected to the PCI 235 via the bridge 237.

The signal processing unit 230 decompresses received streaming data (for example, decompresses data compressed via MPEG4, Windows (registered trademark) Media Player, and Real Video). The decompressed video signal is supplied to the image processing unit 222 for display on the primary display unit 202. This enables the primary display unit 202 to display the broadcast signals from the main tuner 210a and the BS/CS digital tuner 212 and the HTML content and streaming content received from the LAN 214 via broadband connections.

The signal processing unit 230 encrypts the video signal received from the sub-tuner 210b and the BS/CS digital tuner 212, converts the encrypted video signal to a format transmittable wirelessly, and sends the converted signal to the secondary display unit 300 via the access point 208. When streaming content received via broadband connections is displayed on the secondary display unit 300, the signal processing unit 230 does not decompress the content but sends it directly to the secondary display unit 300 via the access point 208 in the streaming-compressed format, in other words, in the through mode. On the other hand, the signal processing unit 230 processes the control signal received from the secondary display unit 300 via the access point 208 and sends the processed control signal to the system controller 244 on the primary display unit 202 side. In this case, the secondary display unit 300 decompresses the streaming content.

The secondary display unit 300 described above may include circuits 304 for carrying out communication with the primary display unit 202, compression/decompression processing, and system control operations. The circuits 304 of the secondary display unit 300 may include a communication apparatus 310 for carrying out wireless communication with the access point 208 and a signal processing unit 320 connected to the communication apparatus 310. The signal processing unit 320 may include a system controller 322 and a DSP 324 that control the operation of the secondary display unit 300. The system controller 322 and the DSP 324 are connected via a PCI 326.

A display panel such as an LCD 332, a transparent touch panel 334 provided on the screen of the LCD 332, and a speaker 336 are connected to the signal processing unit 320. Also connected to the signal processing unit 320 is a memory card 338 inserted into a memory card insertion unit. A battery is also provided in the power control unit, which will be described later, as the power supply. The battery can be charged, for example, by the power supply circuit stored in the table 302 shown in FIG. 7. The signal processing unit 320 decrypts an encrypted video signal received from the access point 208, decrypts data received via the Internet 130, and displays the decrypted signal on the LCD 332. In addition, the signal processing unit 320 sends control signals, such as a command generated during the operation of the touch panel 334, to the primary display unit 202. The signal processing unit 320 also has a function to decrypt data, such as still images stored in the memory card 338, and to display the decrypted data on the LCD 332.

In the image reception system 100 described above, a base-band analog video signal demodulated by the main tuner 210a is converted to a digital signal, and then its image quality is improved, and interlace progressive processing is performed by the image processing unit 222. After that, the signal is displayed on the display panel 203 via the DVI 224.

In addition, a base-band analog signal demodulated by the sub-tuner 210b is supplied to the signal processing unit 230, converted to a digital signal, and then compressed into digitally compressed format using MPEG2 and MPEG4. After encryption, the compressed video signal is sent through the wireless LAN to the secondary display unit 300 via the access point 208. The signal is decrypted and decompressed by the signal processing unit 320 of the secondary display unit 300 and is displayed on the LCD 332.

When the BS/CS digital broadcast signal is received from the input source, the BS/CS digital broadcast signal is input to the BS/CS digital tuner 212. After demodulation by the digital front-end block of the BS/CS digital tuner 212, the BS/CS digital broadcast signal is decrypted to the digital video signal by the video decoder 242. The digital video signal is displayed on the display panel 203 via the image processing unit 222 and the DVI 224.

The video signal in the form of the SD signal output from the video decoder 242 is transmitted to the signal processing unit 230 and compressed into a digitally compressed format and encrypted by the signal processing unit 230. Then, the signal is sent from the access point 208 of the wireless LAN to the secondary display unit 300. When the HD signal is received from the input source, the signal is down-converted into a video signal in the form of the SD signal and is sent to the signal processing unit 230. This down-conversion processing is performed to protect the copyrights of digital broadcast content.

When streaming content from the Internet is received from the input source, the signal received from the LAN 214 is decoded by the signal processing unit 230 in the streaming decode mode according to the streaming compression format (MPEG4, Windows (registered trademark) Media Player, Real Video, etc.) and is sent to the display panel 203 via the image processing unit 222 and the DVI 224.

When streaming content is displayed on the secondary display unit 300, the signal is not decoded by the signal processing unit 230 but is sent directly to the secondary display unit 300 in the streaming compression format through the wireless LAN. The streaming-compressed signal is decompressed by the signal processing unit 320 of the secondary display unit 300, the decompressed video is displayed on the LCD 332, and the decompressed voice is reproduced by the speaker 336. This processing decompresses and re-codes the streaming content to prevent the content from being degraded.

Predetermined copyright protection processing is performed for analog broadcast signal content, digital broadcast signal content, and multimedia content such as streaming content received by the image reception system 100 described above.

Figure 9:
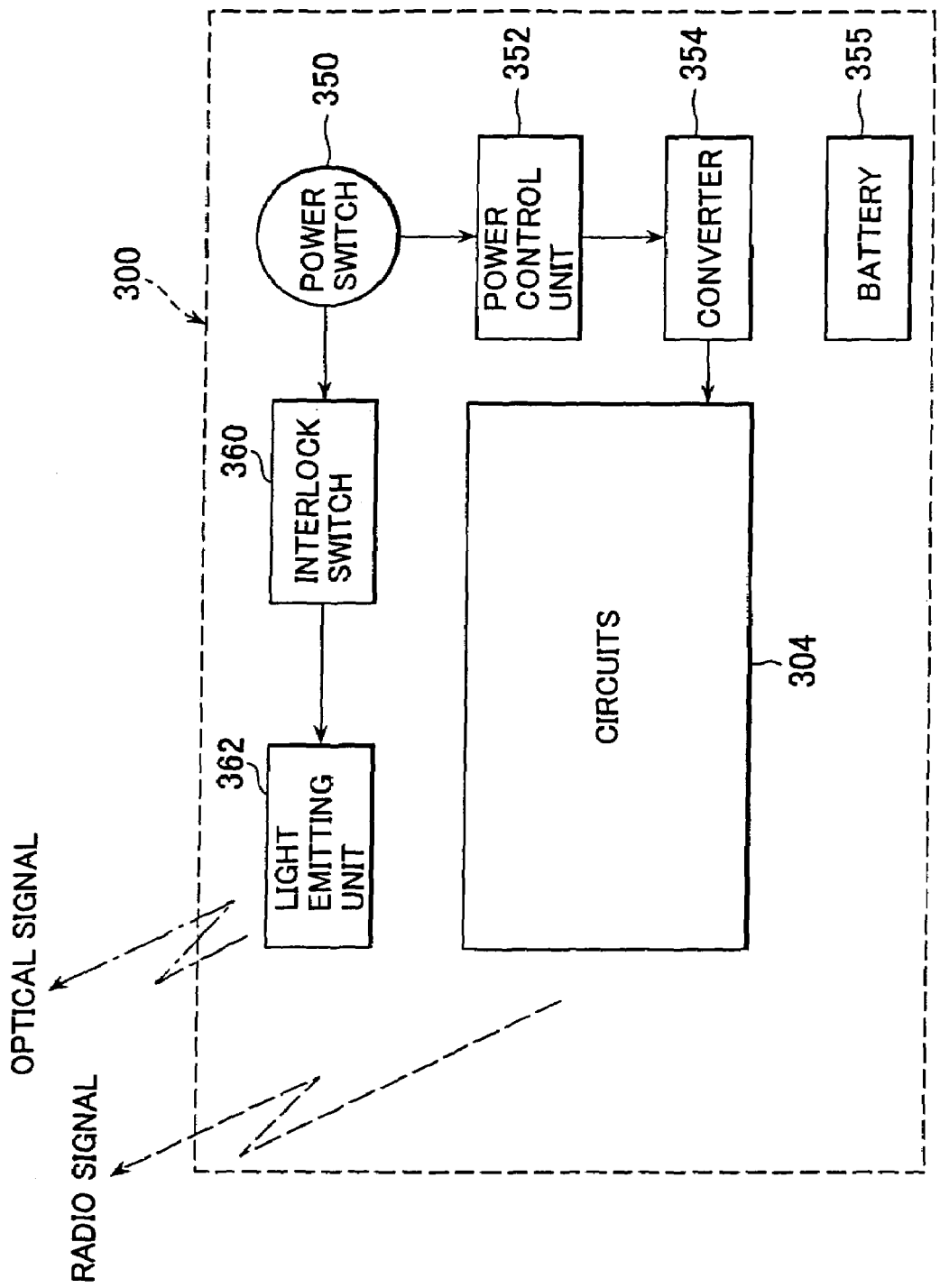
FIG. 9 is a block diagram showing an example of the configuration of a power supply unit of a child unit according to a preferred embodiment of the present invention.

Next, the configuration of the power supply unit of the parent unit 20 composed of the primary display unit 202 and the media receiver 204 and that of the child unit composed of the secondary display unit 300 will be described with reference to the drawings. FIG. 9 is a block diagram showing the configuration of the power supply unit of a child unit composed of the secondary display unit 300.

First, as shown in FIG. 9, the child unit composed of the secondary display unit 300 may include circuits 304 that carry out communication with the primary display unit 202, perform compression/decompression processing, and perform system control processing; a power switch 350 used for turning on/off the power of the secondary display unit 300; and a power control unit 352 that supplies the power supply voltage from a battery 355 to the circuits 304 via a converter 354 when the power switch 350 is turned on. The converter 354 described above converts the power supply voltage of the battery included in the secondary display unit 300 to a voltage necessary for the circuits 304. More specifically, the converter 354 includes a DC-DC converter.

The secondary display unit 300 further includes an interlock switch 360 that is turned on/off when the power switch 350 is turned on/off; and a light emitting unit 362 that emits an optical signal (power control signal) for turning on/off the primary display unit 202 when the interlock switch 360 is turned on/off. The light emitting unit 362 includes a light emitting element and its controller. More specifically, the light emitting unit 362 includes an IRLED (IR light emitting diode) that emits infrared light and an IR controller that controls the IRLED.

Figure 10:
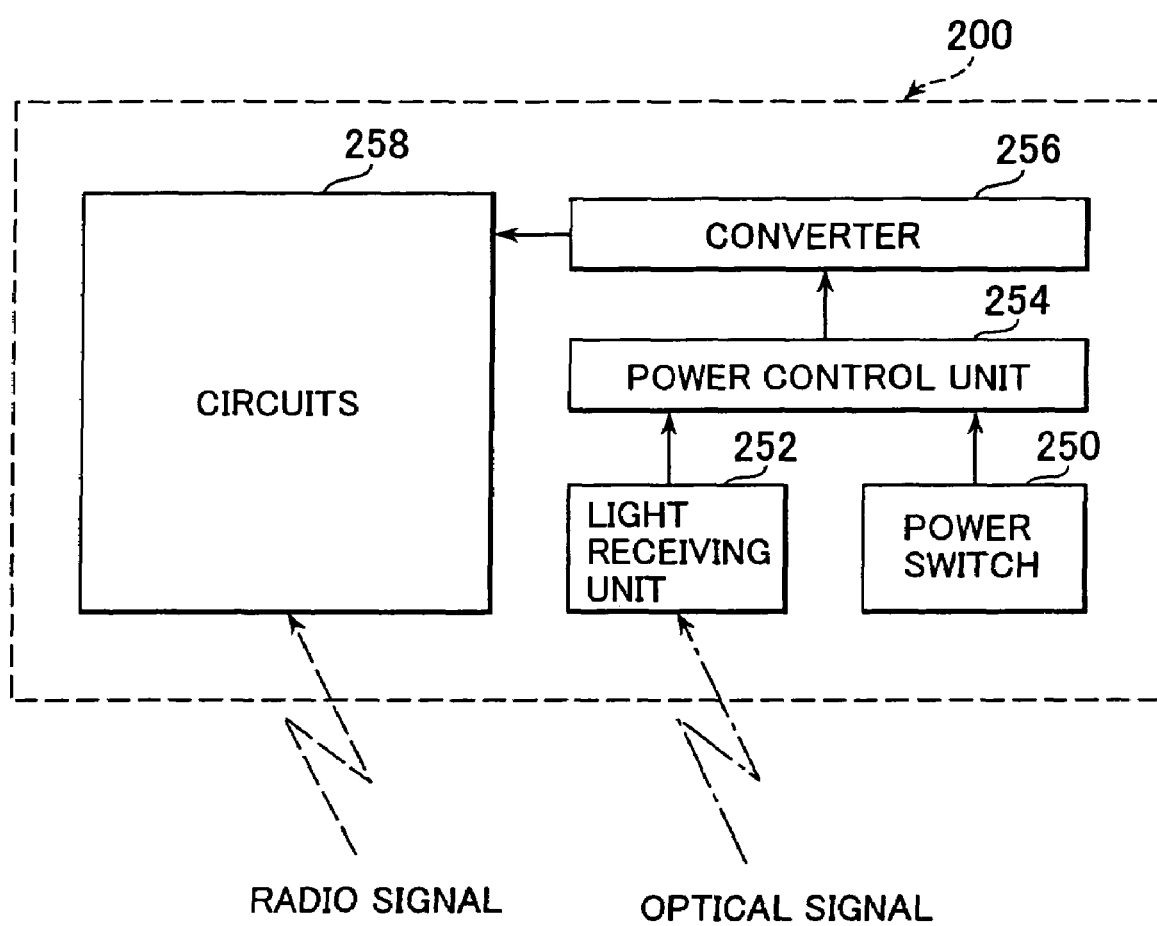
FIG. 10 is a block diagram showing an example of the configuration of the power supply unit of a parent unit according to a preferred embodiment of the present invention.

On the other hand, FIG. 10 shows the configuration of the parent unit 200 having the primary display unit. FIG. 10 is a block diagram showing the configuration of the power supply unit of the parent unit 200 having the primary display unit. To simplify the illustration in FIG. 10, the configuration of the primary display unit 202 and the configuration of the media receiver 204 are combined. For example, circuits 258, a power control unit 254, and a converter 256 shown in FIG. 10 are collectively those of the primary display unit 202 and those of the media receiver 204.

As shown in FIG. 10, the power supply unit includes a power switch 250 that turns on/off the power of the primary display unit 202 and the media receiver 204 of the parent unit 200; a light receiving unit 252 that receives an optical signal (corresponding to the power control signal) from the light emitting unit 362 of the secondary display unit (child unit) 300; and a power control unit 254 that supplies the power supply voltage from the commercial power supply to the circuits 258 of the primary display unit 202 and the media receiver 204 via the converter 256 based on the power on/off state of the power switch 250 or the power control signal received by the light receiving unit 252. The converter 256 converts the voltage of the commercial power supply, which supplies the power to the primary display unit 202 and the media receiver 204, to a voltage necessary for the circuits 258.

The power switch 250 of the parent unit 200 may be provided on the primary display unit 202 or on the media receiver 204. When one power switch 250 is turned on/off, both the primary display unit 202 and the media receiver 204 are turned on/off. Although provided on the media receiver 204 side according to this embodiment, the light receiving unit 252 of the parent unit 200 may also be provided on the primary display unit 202 side.

The power-on operation in the image reception system 100 with the configuration described above will be described with reference to the drawings. FIG. 11 is a diagram showing the power-on operation of the image reception system 100.

Figure 11A:
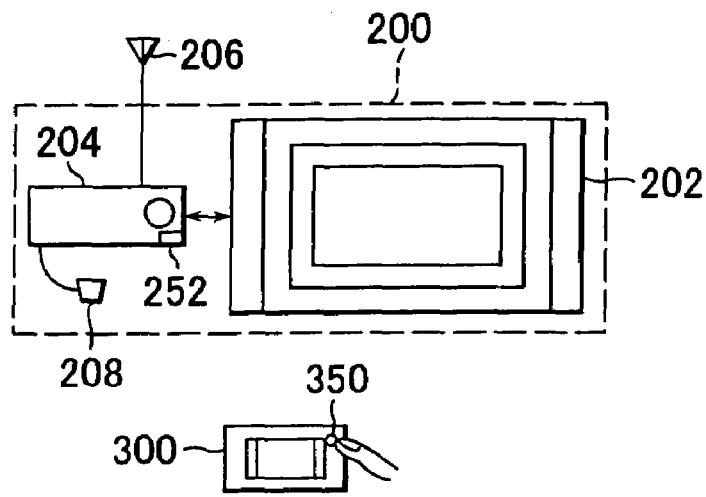
FIGS. 11A, 11B and 11C are diagrams showing the power-on operation of the image reception system according to a preferred embodiment of the present invention.
Figure 11B:
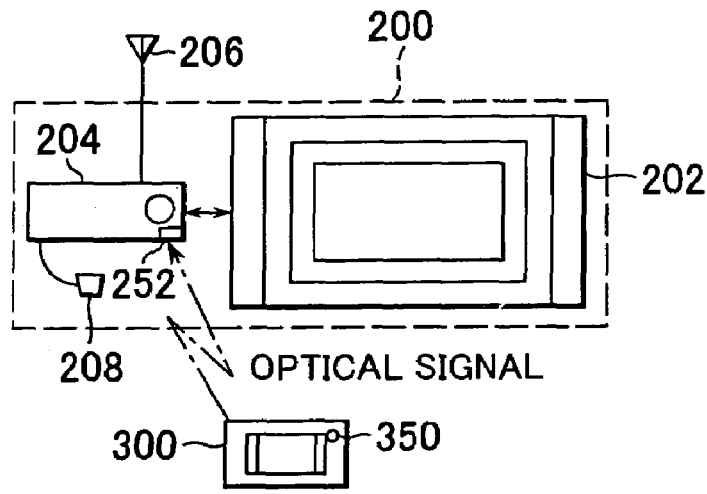

When the power switch 350 of the secondary display unit (child unit) 300 is turned on as shown in FIG. 11A, the necessary driving voltage is supplied to the circuits 304 of the secondary display unit 300 by the power control unit 352, the interlock switch 360 is turned on interlocked with the power switch 350 being turned on, and the optical signal (power control signal) of an infrared light is issued from the light emitting unit 362, as shown in FIG. 11B. When the parent unit 200 receives the optical signal (power control signal) from the secondary display unit (child unit) 300 via the light receiving unit 252, the necessary driving voltage is supplied from the commercial power supply to the circuits 258 of the parent unit 200 even when the power switch 250 of the parent unit 200 is not turned on. More specifically, the primary display unit 202 and the media receiver 204 of the parent unit 200 change their state from the standby state (in which a standby voltage much lower than the driving voltage is applied) to the power-on state (in which the driving power is applied). Therefore, mutual communication is made possible between the secondary display unit (child unit) 300 and the media receiver 204 of the parent unit 200.

Figure 11C:
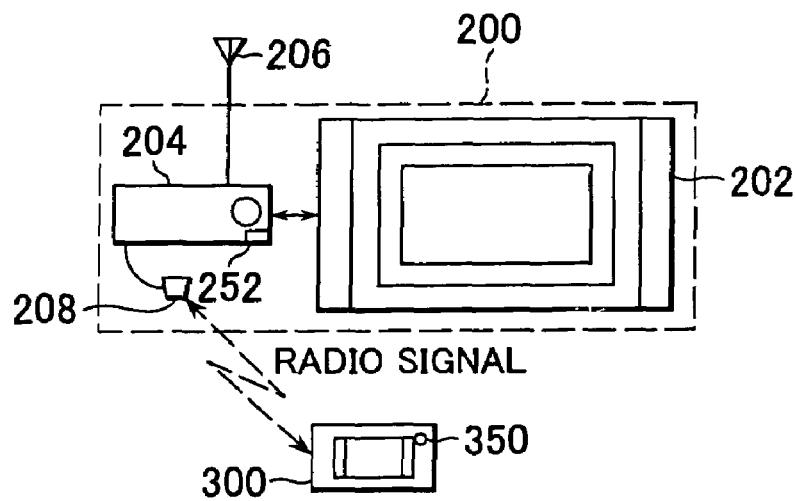

When the power of the secondary display unit (child unit) 300 is turned on as described above, the power of the parent unit 200 is automatically turned on and mutual communication between the media receiver 204 of the parent unit 200 and the secondary display unit (child unit) 300 becomes possible. Then, as shown in FIG. 11C, the secondary display unit (child unit) 300 performs wireless communication authentication (mutual authentication) with the media receiver 204 of the parent unit 200. Once wireless communication is established, multimedia content data, such as broadcast video content and streaming content, can be sent and received between the media receiver 204 of the parent unit 200 and the secondary display unit (child unit) 300. Thus, those videos and music can be displayed not only on the primary display unit 202 of the parent unit 200, but also on the secondary display unit (child unit) 300.

The image reception system 100 with this configuration may eliminate the need for turning on the power switch 250 of the parent unit 200, because the power of the primary display unit 202 and the media receiver 204 of the parent unit 200 can be turned on by simply turning on the power switch of the secondary display unit (child unit) 300. This enables wireless data communication with the media receiver 204 of the parent unit 200 by simply turning on the power of the secondary display unit (child unit) 300, thus increasing ease of use.

In particular, the image reception system according to this preferred embodiment allows the secondary display unit (child unit) 300 to wirelessly receive a broadcast video, received by the tuner included in the media receiver 204 of the parent unit 200, for displaying the broadcast video on the secondary display unit (child unit) 300. Therefore, when the user wants to view a broadcast video only on the secondary display unit (child unit) 300 side, the user needs only to turn on the power switch 350 of the secondary display unit (child unit) 300. Then, the power supply of the media receiver 204 of the parent unit 200 is automatically turned on, and wireless communication between the secondary display unit (child unit) 300 and the media receiver 204 becomes possible. As described above, simply turning on the power switch 350 of the secondary display unit (child unit) 300 allows the user to view a video on the child unit and therefore, as compared with the conventional method in which the power switch of the parent unit must also be turned on, the image reception system according to this embodiment may ensure increased ease of use.

In the description of the second preferred embodiment of the present invention, when the power switch 350 of the secondary display unit (child unit) 300 is turned on, the power of the whole media receiver 204 is turned on to supply the driving voltage to all the circuits shown in FIG. 8. The present invention is not limited to this configuration; instead, it is also possible to supply the driving voltage only to the minimum required portion of the circuits of the media receiver 204. For example, it is also possible to supply the driving voltage at least to the portion that performs wireless two-way communication with the secondary display unit (child unit) 300 (communications unit) and to the content reception unit, such as the main tuner 210a, sub-tuner 210b, and BS/CS digital tuner 212, that receives multimedia content such as video content. More specifically, the driving voltage may be supplied to the portion of the circuits in FIG. 8 surrounded by the heavy dashed line.

By supplying the driving voltage to a portion of the circuits in the media receiver 204 in this way, only the required and sufficient portion may be driven to give access to multimedia content, received by the media receiver 204, on the secondary display unit (child unit) 300 side. Because the primary display unit 202 having a power-consuming, large screen is off in this case, the power consumption may be reduced.

Figure 12:
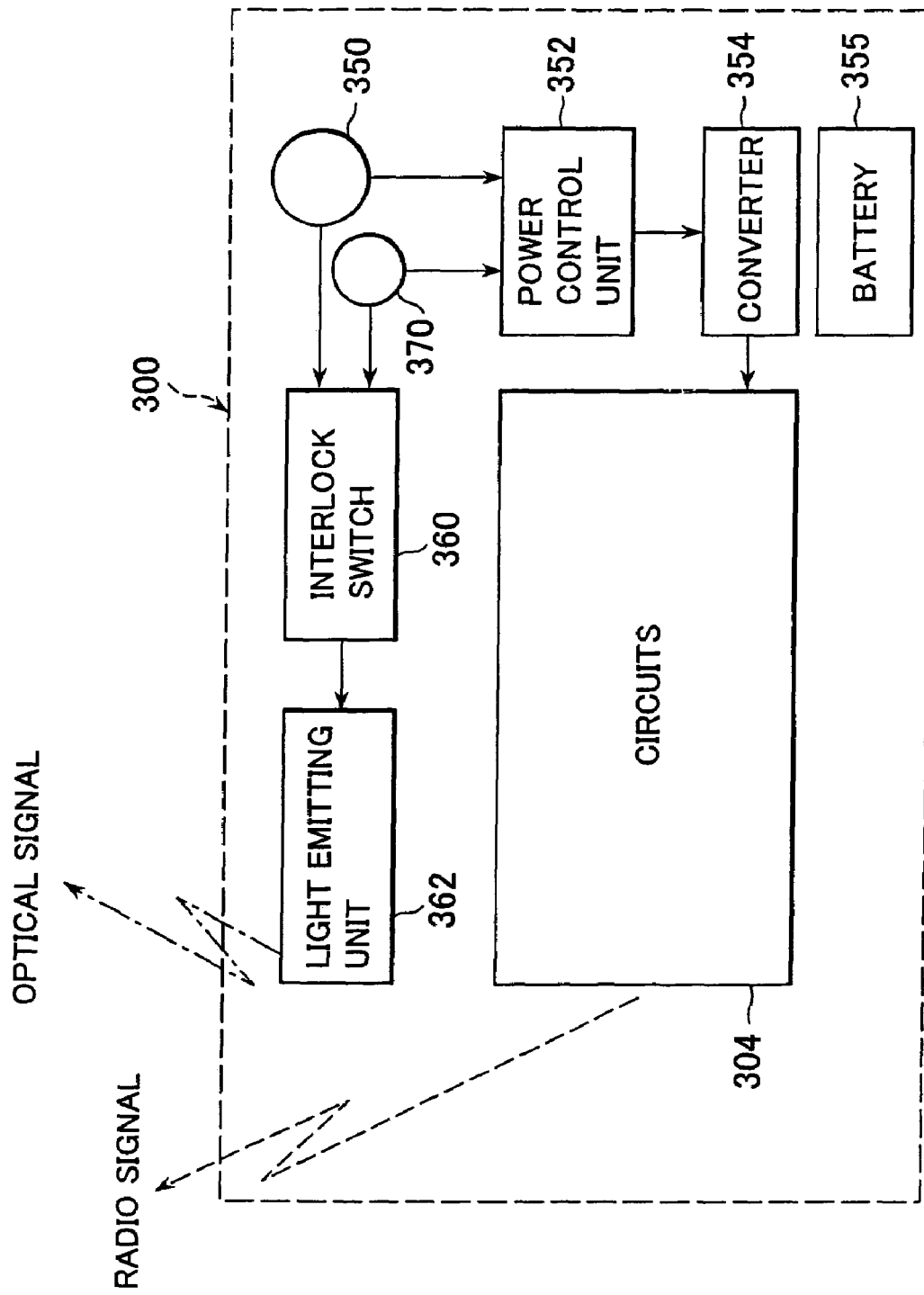
FIG. 12 is a block diagram showing another example of the configuration of a child unit according to a preferred embodiment of the present invention.

When the driving voltage is supplied to a portion of the circuits in the media receiver 204 by turning on the power switch 350 of the secondary display unit (child unit) 300 as described above, a primary display switch 370, as shown in FIG. 12, may be provided separately from the power switch 350 on the secondary display unit (child unit) 300 side for turning on the power of the primary display unit 202.

When such a primary display switch is turned on/off, the primary display power control signal (the optical signal generated as an infrared light, for example) is sent from the issuing means (the light emitting unit 362, for example) on the secondary display unit (child unit) 300 side. This optical signal (primary display power control signal) is received by the reception means (for example, the light receiving unit 252) of the media receiver 204 of the parent unit 200, and the driving voltage is supplied to or removed from the primary display unit 202 and the portion (for example, the portion surrounded by the heavy dashed line in FIG. 8) of the circuits of the media receiver 204 that performs the processing for the primary display unit 202. In this configuration, the user who also wants to view a video on the primary display unit 202 may simply turn on the primary display switch on the secondary display unit (child unit) 300; then, the power of the primary display unit 202 is turned on and the user can watch the video.

The configuration of the primary display switch 370 described above is not limited to the one shown in FIG. 12 in which the primary display switch 370 is provided next to the power switch 350 of the secondary display unit (child unit) 300. For example, it is also possible for the primary display switch 370 to be displayed on the LCD 332 as a button which the user can operate through the touch panel 334. When the power switch 350 of the secondary display unit (child unit) 300 according to this embodiment is turned on, the power to the media receiver 204 of the parent unit 200 is automatically turned on with wireless communication established between the secondary display unit (child unit) 300 and the media receiver 204 of the parent unit 200. Therefore, the primary display power control signal may be issued through wireless communication by operating the button of the primary display switch 370 through the operation of the touch panel 334.

Instead of separately providing the primary display switch 370 as described above, the power to the primary display unit 202 may also be turned on by holding the power switch 350.

The issuing means of the child unit in the second preferred embodiment of the present invention may include the interlock switch 360 that interlocks with the power switch 350 of the secondary display unit (child unit) 300 and the light emitting unit 362 that is actuated by the interlock switch 360 to issue the power control signal which may be infrared light. The reception means of the parent unit in this preferred embodiment of the present invention may include the light receiving unit 252 that receives the power control signal issued from the secondary display unit (child unit) 300. However, the preferred embodiments of the present invention are not limited to this configuration.

For example, the issuing means of the child unit is not always required to provide the interlock switch 360, such as the one shown in FIG. 9, which interlocks with the power switch 350. Instead of providing the interlock switch 360, it is also possible to provide a determination unit, as in the first preferred embodiment of the invention mentioned above, that determines if the power switch 350 is on/off and, based on the determination result of the determination unit, causes the light emitting unit 362 to issue the power control signal. In addition, it is also possible for the issuing means of the child unit to include a transmitter that issues a predetermined electric wave signal, such as the one used in the keyless entry system of a car, and for the power control signal reception unit of the parent unit to include a receiver that receives the electric wave signal from the transmitter.

While preferred embodiments of the present invention have been described with reference to the attached drawings, it is to be understood that the present invention is not limited to the embodiments described above. It will be obvious to those skilled in the art that various changes, modifications, combinations, subcombinations and alterations may be made depending on design requirements and other factors insofar as they are within the scope of the appended claims or equivalents thereof.

The present invention is applicable to a communication system, a communication apparatus, an image reception system, and a communication method.

The invention claimed is:

1. An image reception system for carrying out two-way wireless data communications of multimedia content between devices, the image reception system comprising:
   a child unit; and
   a parent unit operable to communicate with the child unit;
   the child unit including:
      a power switch for turning power to the child unit on/off;
      a signal generator operable to issue a power control signal for turning power to the parent unit on/off in response to turning the power switch on/off;
      a first data communication unit operable to carry out two-way wireless data communications with the parent unit; and
      a secondary display for playing back the multimedia content; and
   the parent unit including:
      a receiving unit operable to receive the power control signal from the signal generator of the child unit;
      a power controller operable to turn power to the parent unit on/off in response to reception of the power control signal from the receiving unit;
      a second data communication unit operable to carry out two-way wireless data communications with the child unit; and
      a primary display for playing back the multimedia content.

2. The image reception system according to claim 1, wherein
   the signal generator of the child unit includes an interlock switch that is actuated in response to operation of the power switch, and a light emitting unit operable to emit the power control signal as infrared light in response to actuation of the interlock switch; and
   the receiving unit of the parent unit includes a light receiving unit operable to receive the power control signal as infrared light from the child unit.

3. The image reception system according to claim 1, wherein
   the signal generator of the child unit includes a determination unit operable to determine whether the power switch of the child unit is turned on or off, and a light emitting unit operable to issue the power control signal as infrared light based on a result of the determination by the determination unit; and
   the receiving unit of the parent unit includes a light receiving unit operable to receive the power control signal as infrared light from the child unit.

4. The image reception system according to claim 1, wherein
   the signal generator of the child unit includes a transmitter operable to transmit the power control signal as an electric wave in response to operation of the power switch; and
   the receiving unit of the parent unit includes a receiver operable to receive the power control signal as an electric wave from the transmitter of the child unit.

5. The image reception system according to claim 1, wherein the parent unit further includes a content reception unit operable to receive the multimedia content; and
   the power controller of the parent unit is further operable to supply or interrupt a driving voltage to at least the second data communication unit and the content reception unit when the receiving unit receives the power control signal from the child unit.

6. The image reception system according to claim 5, wherein
   the child unit further includes a primary display switch for turning power to the primary display on/off;
   the signal generator of the child unit is further operable to issue a primary display power control signal when the primary display switch is turned on/off; and
   the power controller of the parent unit is further operable to supply or interrupt a driving voltage to the primary display and to a section that performs processing for the primary display based on the primary display power control signal when the receiving unit receives the primary display power control signal from the signal generator of the child unit.

* * * * *